United States Patent [19]

Patel

[11] Patent Number: 5,053,953

[45] Date of Patent: Oct. 1, 1991

[54] APPARATUS FOR ALIGNING ARITHMETIC OPERANDS DURING FETCH

[75] Inventor: Shirish Patel, Waltham, Mass.

[73] Assignee: Bull HN Information Systems Inc., Billerica, Mass.

[21] Appl. No.: 461,554

[22] Filed: Jan. 5, 1990

[51] Int. Cl.$^5$ .......................... G06F 7/00; G06F 7/38
[52] U.S. Cl. .................................. 364/200; 364/259.5
[58] Field of Search ............................... 364/200, 900

[56] References Cited

U.S. PATENT DOCUMENTS 4,268,909  5/1981  Kindell et al. ..................... 364/200
4,506,345  3/1985  Boothroyd et al. ................ 364/900

Primary Examiner—Michael R. Fleming
Assistant Examiner—Glenn A. Auve
Attorney, Agent, or Firm—Gerald J. Cechony; Faith F. Driscoll; John S. Solakian

[57] ABSTRACT

In a digital computer system in which arithmetic operands are addressed in instructions by their most significant digits, and in which operands need not start or end on particulr boundaries in system memory, apparatus is provided for calculating information from data available during instruction decoding and for using that information during operand fetching to fetch operands least significant digit first, and to store them in a scratchpad memory right-justified on double-word boundaries and filled with leading zeros.

6 Claims, 4 Drawing Sheets

APPARATUS FOR ALIGNING ARITHMETIC OPERANDS DURING FETCH

RELATED PATENT APPLICATIONS

1. The patent application of Shirish Patel entitled, "Parallel Storage of Data and Control," filed on Jan. 11, 1990, bearing Ser. No. 07/464,503, which is assigned to the same assignee as this patent application.

2. The patent application of Shirish Patel entitled "Apparatus for Skipping Arithmetic Calculations Involving Leading Zeros," filed on Jan. 11, 1990, bearing Ser. No. 07/464,504, which is assigned to the same assignee as this patent application.

3. The patent application of Shirish Patel entitled, "Apparatus for Fetching the LSD of a Multiword Operand," filed on Jan. 5, 1990, bearing Ser. No. 07/461,555, which is assigned to the same assignee as this patent application."

FIELD OF THE INVENTION

This invention relates to digital computer systems, particularly to those portions thereof that perform arithmetic computations, and most particularly to means for fetching operands into those portions in a form requiring little manipulation prior to performing the computations.

BACKGROUND OF THE INVENTION

A digital computer system typically includes a memory for storing instructions (collectively said to constitute a "program") and operands (collectively constituting "data") to be operated upon by the instructions. It typically also includes a means for fetching the instructions from memory, decoding them, fetching from memory the operands called for by the instructions, performing upon the operands the operations called for by the instructions, and storing the modified operands back in memory.

Some of the operations called for by the instructions may be arithmetic operations, requiring two operands to be added or multiplied, one to be subtracted from the other, or one to be divided into the other.

A memory unit typically has a certain number of bits that it can store and retrieve in a single operation, commonly known as a the "word size" of the memory. The data paths ("buses" and registers) within the computer system typically are provided to handle the same word size. Typical word sizes are sixteen or thirty-two bits.

For most efficient operation of a computer system, operand size should be limited to the word size; however, such an approach might not suit the needs of the user. Therefore, many computer systems have provision for performing computations on operands that must be stored and passed around the system in several words.

To enhance the ease of programming such systems, it is customary to require the programmer to specify the starting memory location of an operand (the location of what is commonly called the "MSD", the most significant digit, of the operand). However, the computations must begin with the LSD (the least significant digit) of the operand, so that carries may propagate a properly. Where an operand spans several words, the execution hardware must determine the LSD address from the MSD address and operand characteristics and length.

An additional complication occurs when operands occupy some thing other than an integral number of computer words, as is often the case in systems which accommodate representations of decimal numbers (as opposed to requiring that all numbers be translated to their binary equivalents). Such systems typically represent decimal numbers in BCD (binary-coded decimal), which requires four bits to store a decimal digit, or in some standard data transmission code such as ASCII code or EBCDIC code, which require eight bits to store a decimal digit. This means that several digits can be stored in one sixteen-bit or thirty-two-bit word.

For the convenience of the user-programmer, it is not customary to require that operands completely occupy words, or that they begin or end on word boundaries. Thus, for such operands, the arithmetic execution hardware must not only determine the address of the word containing the LSD, but must further deter mine where within a word the LSD resides, and where within a word a the MSD resides. Further, the hardware must not disturb bits that are not part of a current operand within a word partially occupied by the current operand.

The manipulations that the execution hardware must perform to facilitate these considerations result in overhead, with a commensurate reduction in efficiency and throughput.

It is thus a general object of the present invention to pro vide improved digital computer systems.

It is a particular object of the present invention to increase the efficiency of the arithmetic elements of computer systems.

SUMMARY OF THE INVENTION

The present invention provides a digit shifter for aligning operands to its register boundaries during operand fetching. During decoding of an instruction calling for the operands, information is derived from the operand specification which controls the shifter during operand fetching to achieve this end.

Other advantages of the invention will be apparent to those skilled in the art after consulting the ensuing description and the accompanying drawings, wherein:

DETAILED DESCRIPTION OF THE PREFERRED EMBODIMENT

Figure 1:
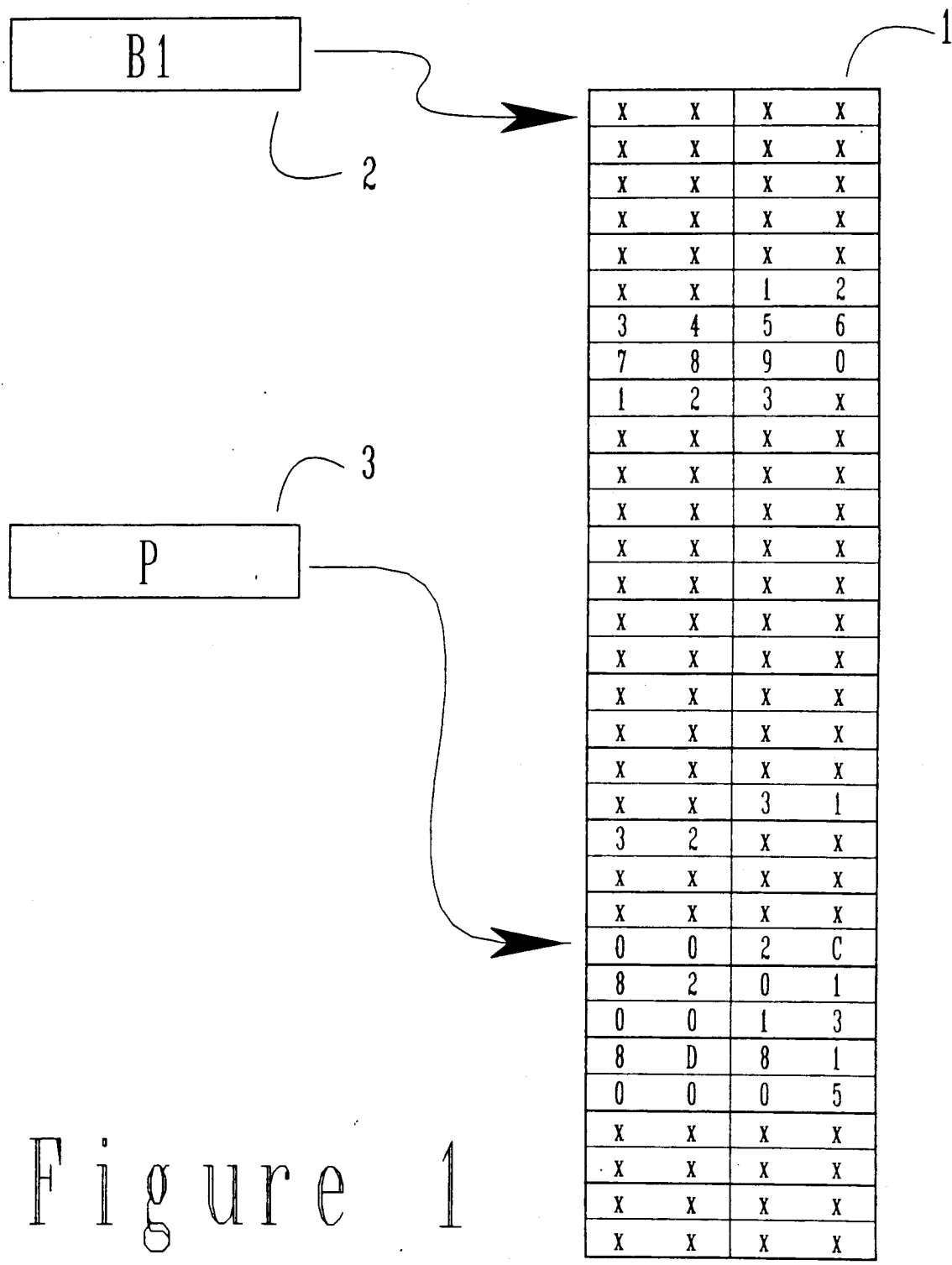
FIG. 1 shows a portion of system memory containing an assumed instruction and its operands.

The invention is embodied in the Commercial Instruction Processor (CIP) of a BULL NH Information Systems DDS 6000 medium-scale computer system.

The system comprises several subsystems, including a Memory Unit for storing instructions and data, the I-Unit (instruction Unit) for retrieving instructions from memory and decoding them, the A-unit (Address Unit) for calculating memory addresses from formulas that may be provided in the instructions and retrieving data from those addressed, and an E-unit (Execution Unit) for executing the instructions.

The CIP (sometimes known as the C-Unit) is a system component for executing commercial instructions, which may be regarded as a subset of the DPS6000 instruction set. The commercial instructions are categorized as numeric instructions (for performing numerical calculations), alphabetic instructions (for performing string moves, string compares, and the like), edit instructions (for reformatting operands) and branch instructions. The present invention may be understood in the context of numeric instructions; therefore, the alphabetic instructions, the edit instructions, and the branch instructions will not be described herein.

A commercial numeric instruction comprises a one-word (16-bit) Operation Code (Op Code) immediately followed by words identifying one or more Data Descriptors (DD's). Each instruction in the repertoire implicitly operates on a specific number of operands (always 1, 2, or 3); there must be a DD for each of the operands specifying such things its memory address, its length, and its data type.

There are six data types that may be operated upon by the commercial numeric instructions. The six types fall into two broader categories: packed and unpacked.

Packed data comprises BCD digits; it thus requires 4 bits (or a half byte) to store one digit; four digits can be stored in one 16-bit word.

Unpacked data (also known as "zoned" data or "string" data) is typically in ASCII code; it thus requires a byte (8 bits) to store a digit, with the rightmost (less significant) half-byte containing the digit in BCD and the leftmost (more significant) half-byte containing "zone" data—a hexadecimal 3 for ASCII a code. Two digits can be stored in one 16-bit word. The data fall into the six types according to whether packed or unpacked, and further according to the form of the sign:

| DATA TYPE | DESCRIPTION |
| --- | --- |
| ZU | Zoned, unsigned (assumed positive) |
| ZL | Zoned, leading sign |
| ZT | Zoned, trailing sign |
| TP | Zoned, trailing overpunched sign |
| PU | Packed, unsigned (assumed positive) |
| PT | Packed, trailing sign |

"Leading sign" indicates that the first element of the operand (i.e., the first half-byte for packed data or the first byte for zoned data) contains the sign and not a data digit.

"Trailing sign" indicates that the last element contains the sign and not a data digit.

"Trailing overpunched sign" (also known as "trailing punch") indicates that the final character of a zoned operand is coded to denote both the numerical digit and the sign; this represents a deviation from standard ASCII or EBCDIC code. The nature of the coding need not be understood to comprehend the present invention; it need be interpreted only at the time of doing the actual numerical calculation.

Therefore, the number of digits in a ZU, PU, or TP operand is equal to the specified length of the operand, whereas the number of digits in a ZL, ZT, or PT operand is one less than the specified length of the operand, since one digit position is allocated to the sign in those data types. The maximum length that may be specified for a commercial numeric operand is $63_{10}$. The length must be specified to indicate that there is at least one digit. That is, the length must equal at least two for ZL, ZT, or PT operands, and at least one for ZU, PU, or TP operands.

The commercial numeric instructions that are facilitated by the present invention are:

| NAME | MNE-MONIC | OP CODE | FUNCTION |
| --- | --- | --- | --- |
| Decimal Add | DAD | 002C | (DD2) + (DD1) → (DD2) |
| Decimal Subtract | DSB | 002D | (DD2) − (DD1) → (DD2) |
| Decimal Multiply | DML | 0029 | (DD2) × (DD1) → (DD2) |
| Decimal Divide | DDV | 002B | $\frac{(DD2)}{(DD1)}$ → (DD3)  Remainder → (DD2) |

As mentioned above, each instruction comprises a one-word Op Code followed by information specifying as many DD's (Data De scriptors) as the instruction has operands (i.e., two for DAD, DSB, or DML, three for DDV). The Op Code is followed by DD1 and DD2, and then by DD3 if it is a DDV instruction. The legend "(DDn)" means "the operand specified by the n'th DD".

DD's may accompany the instruction (in which case they are known as Immediate DD's or ID's) or they may be stored elsewhere in memory (in which case they are known as Remote DD's or RD's). The first word of each DD specifier accompanying the instruction (i.e., the word following the Op Code, the word following the first DD specifier, and the word following the second DD specifier for a DDV instruction) may in fact be the first word of a DD, or it gives information specifying where to find the first word of the DD. The basis of this determination will be preliminarily explained now, and will be clearer after expostulating the AS (Address Syllable) field of a DD, further below:

If the four low-order bits of the DD specifier are all zeros, this indicates that the DD is a Remote DD—the twelve high-order bits of the DD specifier (collectively known as a "label") are multiplied by two and added to the contents of a register called the Remote Descriptor Base Register (RDBR) to produce the address of the Remote DD. (The RDBR would, of course, have been preloaded by the program which provided the current commercial numeric instruction.)

If the seven low-order bits of the DD specifier contain $58_{16}$, this indicates that the current DD will use Address Map 3, 4, or 5, as opposed to Address Map 2 which is the default Address Map as will be explained further below. In this case, the next sequential word in memory is the first word of the DD.

If neither of the above two conditions is met, the first word of the DD specifier is the first word of the DD.

NOTE

In the ensuing discussion, the following conventions will be employed:

The letter "H" denotes hexadecimal. E.g., "32H" denotes hexadecimal 32.

The letter "B" denotes binary. E.g., "00000100B" denotes a binary number having a value equal to decimal 4.

A number without an "H" or "B" appended shall be presumed to be decimal.

When specifying bit locations within a binary word, bit 0 is the leftmost or least significant bit, and bit 15 is the rightmost or most significant bit.

A colon denotes bit concatenation. For example, REG1:00 would a mean that two zero bits are concatenated to the right of the contents of REG1.

The first word of a DD for commercial numeric operands contains a first-digit-offset field, a sign control field, a length field, a packed/unpacked field, and an address syllable field. Certain of the field lengths are different depending upon whether the operand is packed or unpacked, as specified by the packed/unpacked field, which is bit 8 (bit 8=0 for unpacked, 1 for packed).

The first DD word for packed data is laid out thusly:

A DD may contain additional words after the first, as a function of the entry obtained from the Address Map.

As mentioned above, the address syllables (AS) of a DD is used to select an entry from the Address Map. Several Address Maps are available on the system; the default Address Map for commercial instructions is Address Map 2; however, a DD specifier may stipulate that Address Maps 3, 4, or 5 will be used for a particular operand.

An address Map is organized as a table of 8 rows by 16 columns; table entries are accessed according to the Address Syllable (AS) field of a DD. The high-order three bits of the AS (bits 9–11 or the DD), denotes the

```
| 0 | 1 | 2 | 3 | 4 | 5 | 6 | 7 | 8 | 9 | 10 | 11 | 12 | 13 | 14 | 15 |
| Digit |   |   |                |   |                              |
| Offset|   |   |    Length      | 1 |       Address Syllable        |
         ↑
         Sign
         Control
```

| | |
|---|---|
| Digit Offset: | (Bits 0–1) Specifies the offset within the addressed word of the start (MSD) of the operand. Since four packed digits may occupy a word, the current operand may commence in half-byte 0, 1, 2, or 3 of a word, according to the contents of this field. |
| Sign Control: | (Bit 2) 0 for unsigned (type PU); 1 for trailing sign (type PT). |
| Length: | (Bits 3–7) If equal to 1 through 31, the actual length of the operand; if equal to 0, indicates that the length of the operand is to be found in register Rn(10–15), where n = 4 for DD1, n = 5 for DD2, and n = 6 for DD3. (Note that the latter method is the only way to specify a length greater than 31.) |
| Bit 8: | A 1 indicates that the operand is a packed operand. |
| Address Syllable: | (Bits 9–15) Used to select an entry from the Address Map, which will be described in detail below. |

The first DD word for zoned data is laid out thusly:

"m" field, specify the row, while the low-order four bits (bits 12–15 of the DD), denoted the "n" field, specify

```
| 0 | 1 | 2 | 3 | 4 | 5 | 6 | 7 | 8 | 9 | 10 | 11 | 12 | 13 | 14 | 15 |
|   | Sign |   |                  |   |                              |
|   |Control|  |     Length       | 0 |       Address Syllable        |
  ↑
  Digit
  Offset
```

| | |
|---|---|
| Digit Offset: | (Bit 0) Specifies the offset within the addressed word of the start (MSD) of the operand. Since two unpacked (ASCII) digits may occupy a word, the current ing to the value of this bit. |
| Sign Control: | (Bits 1–2) 00 = unsigned (type ZU); 01 = trailing overpunched sign (type TP); 10 = leading sign (type ZL); 11 = trailing sign (type ZT). |
| Length: | (Bits 3–7) Same as for packed data, i.e., if equal to 1 through 31, the actual length of the operand; if equal to 0, indicates that the length of the operand is to be found in register Rn(10–15), where n = 4 for DD1, n = 5 for DD2, and n = 6 for DD3. (Note that the latter method is the only way to specify a length greater than 31.) |
| Bit 8: | A 0 indicates that the operand is a zoned (string or unpacked) operand. |
| Address Syllable: | (Bits 9–15) Used to select an entry from the Address Map, which will be described in detail below. | the column.

The makeup of Address Map 2 is given in Table 1:

TABLE 1

| | n | | | |
|---|---|---|---|---|
| m | 0 | 1–7 | 8 | 9–F |

TABLE 1-continued

| 0 | Use Remote | Bn + D + 0 | | @[B(n − 8) + D] + 0 |
|---|---|---|---|---|
| 1 | Descriptor | Bn + D + Rm + 0 | P + D + Rm + 0 | @[B(n − 8) + D] + Rm + 0 |
| 2 | | | | |
| 3 | | | | |
| 4 | | | @[P + D] + 0 | |
| 5 | | | AS345 | |
| 6 | | | P + BD + 0 | |
| 7 | | | IM0 | |

The following notational conventions are employed:

Bx denotes Base Register x. Several base registers are provided on the system for performing base-displacement addressing.

D denotes a displacement to be added to the contents of a selected base register to produce an address. The displacement, when one is specified by the AS, is in the second word of the DD.

O denotes the offset, obtained from the offset field of the first word of the DD.

P denotes the Program Counter. (As is well known to those in the art, the Program Counter is used to access the current instruction; it may be used in address calculations to determine the addresses of operands that have been stored at some relation to the location of the instruction.)

Rx denotes the x'th one of several general-purpose registers provided on the system.

BD denotes "binary displacement", a 32-bit signed binary number found in the second and third words of a DD whose first word calls for this function.

IMO denotes "immediate operand", which will be found in the words following the DD calling for an immediate operand, the number of words being indicated by the operand length and offset specificiations.

It is evident, then, that a DD may consists of a number of words, the number being determined by the entry retrieved from the Address Map specified by the first word of the DD.

It is seen from Table 1 that if the n field of an AS is equal to $0000_2$, a Remote Descriptor is to be used. As was mentioned, if the first word Of a DD specifier meets this criterion, a label found in that word will be used to compute the address of the a remote DD.

It is seen that for m=5 and n=8, "AS345" is selected from Address Map 2. As was mentioned, if the first word of a DD specifier meets this criterion, other bits in that word specify ne of Address Maps 3, 4, or 5, and the next word in memory is the first word of a DD using the specified one of those maps. Address Maps 3, 4, and 5 will not be discussed here; they provide other addressing possibilities not necessary to an understanding of the present invention.

The preceding discussion indicates that the commercial instructions may operate upon operands up to 63 positions in length, where the 63 positions may all contain data digits (for e unsigned or trailing overpunched sign data) or where 62 of the positions may contain data digits (for signed data). The address determined from the Address Map retrievals and indicated calculations will be the address of the first position of the operand, commonly called the "MSD" (most significant digit), although this term is a misnomer for operands with leading sign; in that case, the address is pointing to the sign, and the next position contains the actual most significant digit. The calculations performed in the execution of the instruction, however, must begin with the LSD (least significant digit).

Data types can be mixed within an instruction; each of the DD's associated with an instruction may specify any of the data types with no regard for consistency of type with the other DD's of that instruction. Data type of the result is determined by the DD of the operand specified to receive the result.

The memory employed in the present embodiment, though having a 16-bit word size, is organized to retrieve data in "double words", or 32-bit units aligned on even-numbered word addresses.

Decimal operands, as discussed above, particularly in connection with the offset field of the DD, are constrained only to a beginning on byte boundaries (for zoned data) or half-byte bound aries (for packed data). Thus, they are not constrained to beginning or ending on word or double-word boundaries.

The Commercial Instruction Processor of the present embodiment includes a scratch pad memory for the storage of its operands. According to the present invention, when operands are being fetched from memory and stored in the scratch pad, they are right-justified "on the fly" and stored in the scratch pad memory with their LSD's right-justified in the double-word locations of the scratch pad. There is thus no preliminary manipulation to be a done in the CIP to locate the LSD prior to commencing the actual calculation.

The computer system in which the present invention is embodied employs a cache memory in conjunction with the main memory; operands are requested from cache memory and result operands are stored in cache memory. As is well known to those in the computer arts, the cache memory obtains the requested operands from the main memory if they are not already encached, and stores results into the main memory. Understanding of the cache memory is not essential to understanding of the present invention. For purposes of the present discussion, correct operation of cache memory is presupposed.

Operation of the invention will be presented in the contexts of an example. With reference to FIG. 1, portions of memory 1 are shown and assumed to contain a DAD (Decimal Add) instruction and its two operands. Locations whose contents are denoted as a "x" in FIG. 1 are assumed to contain unspecified information; such information must not be altered by the operation of the DAD instruction.

The basic block depicted in the memory map of FIG. 1 is a 4-bit half-byte; half-bytes are demarked from each other by vertical dotted lines. Bytes within a word are demarked by vertical light lines. Words within a double word are demarked by horizontal light lines; double words are demarked from..each other by heavy horizontal lines. The data depicted in memory 1 is hexadecimal numbers.

B1 register 2 is one of the aforementioned base address registers, and is assumed to be pointing to the first location of the depicted portion of memory. (A register containing the address of a location is commonly said to be "pointing to" at location.)

P register 3 is the program counter of the system, and is assumed to be pointing to the location containing the DAD Op Code of 002CH. Thus, that instruction is now to be executed.

The word following the Op Code is seen to be 8201H. Since it does not meet the aforementioned criteria to select a Remote Descriptor or to select Address Map 3, 4, or 5, it must be the first word of DD1.

8201H has bit 8 equal to 0, indicating that it is a DD specifying a zoned operand. Analyzing the bits of 8201H as discussed above in connection with DD analysis, it is seen that:

Bit 0=1, indicating that the first operand starts in the second byte of the addressed word.

Bits 1-2=00, indicating that the first operand is unsigned (type ZU)

Bits 3-7=00010, which equals a decimal 2; this indicates that the first operand is two digits long.

Bits 9-15=0000001. This is the Address Syllable, and is seen to have an m field of 0 and an n field of 1. Consultation of Address Map 2 indicates that this denotes that the address of the first operand may be determined by adding base address register B1, the Displacement, and the offset. (The offset, specified by bit 0, has been seen to indicate that the operand commences in the second byte.)

The Displacement, as previously mentioned, is found in the next memory location and is seen to be 13H. This value is added to the contents of register B1 (previously assumed to be pointing to the start of the depicted memory block) to produce the word address of the first operand; this, in conjunction with the offset field indicating that the operand starts in the second byte and the length field indicating an operand length of two establishes that the first operand is the 3132H shown in 20th and 21st (decimal) words of the depicted memory block. 3132H, interpreted as ASCII code, is the number 12. Thus, the first operand is the number 12.

The next word encountered, 8D81H, does not meet the criteria for being a Remote Descriptor specifier or an "AS34" specifier, and thus is the first word of the DD for the second operand.

Analyzing the other bits of the 8D81H in the contexts of a DD for a packed operand, it is seen that:

Bits )-1 contain $10_2=2$; this indicates that the operand starts at an offset of 2 half-bytes into the addressed word, or in the third half-byte of the addressed word.

Bit 2=0; this denotes that the operand is unsigned (type PU).

The length (bits 3-7) is $01101_2=13_{10}$; the operand is 13 digits long.

The m and n field of the Address Syllable are 0 and 1 respectively; as for the first operand, the address of the starting word of the operand is determined by adding the contents of base address register B1 to the displacement.

The displacement is found in the next word, and is seen to be 5.

It is thus determined that the second operand is the 13-digit number 1234567890123; the operation of the instruction would be to add 12 to this number and store the sum, in PU (packed unsigned) data type in the locations originally occupied by the number 1234567890123.

It will now be shown how the present invention fetches the operands from memory (through the cache, "transparent" to the CIP) into the CIP's scratch pad memory right-justified and filled out with leading zeros, which is not the alignment they have in system memory.

Figure 2:
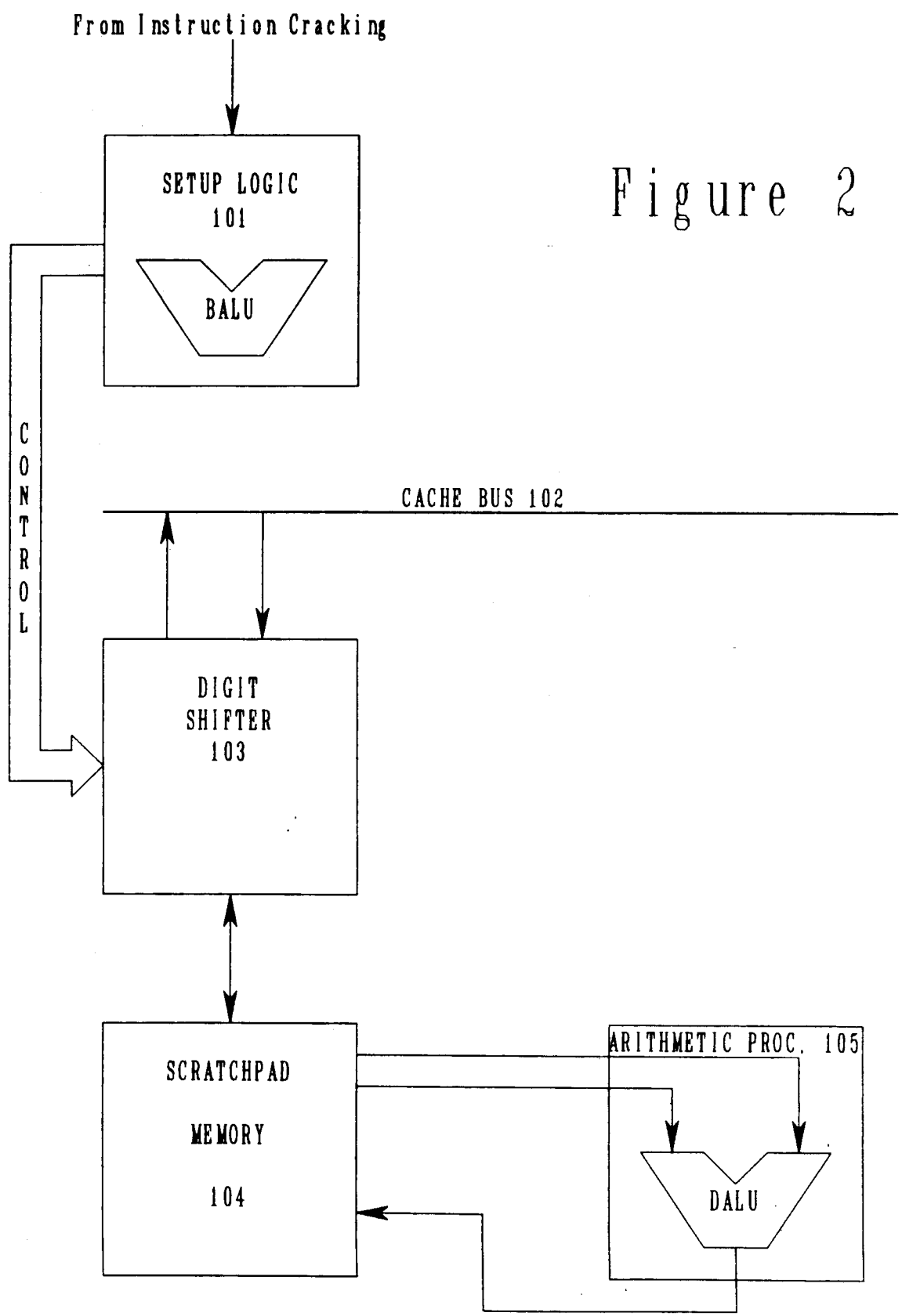
FIG. 2 is an overall block diagram of the Commercial Instruction Processor embodying the present invention.

Hardware and firmware are provided to accomplish this. A high-level block diagram of the CIP hardware is shown in FIG. 2. During the fetching and decoding of an instruction, the instruction cracking logic in the A-Unit and I-Unit send information (to be described in detail below) to Setup Logic 101, which includes a binary ALU (BALU) for performing its analyses. Subsequently the I-Unit and A-Unit cause the operands to appear (one at a time) on Cache Bus 102, where they are input to Digit,Shifter 103. Under controls derived by Setup Logic 101, Digit Shifter 103 performs the requisite alignment and stores the aligned operands in Scratchpad Memory 104, whence they are operated upon to effect the instruction by Arithmetic Processor 105, which includes a decimal ALU (DALU) for performing the computations.

The present invention will receive the first operand (the number 12 in ASCII code (Zoned format)) from Cache Bus 102 and transform it for storage in the SPM in the form 00000012H—i.e., the number 12 in BCD form right justified in a 32-bit (8-digit) double word. It will transform the second operand to the for 00012345H 67890123H—i.e., the number 1234567890-123 in BCD form right justified in two double words.

The fetching of the instruction and Data Descriptors from memory and the decoding of them are performed by the system's I-Unit; memory address calculations and the fetching of operands from memory are performed by the system's A-Unit. Typical operation of such units is known to those in the art and will be presupposed in the present discussion.

Figure 4:
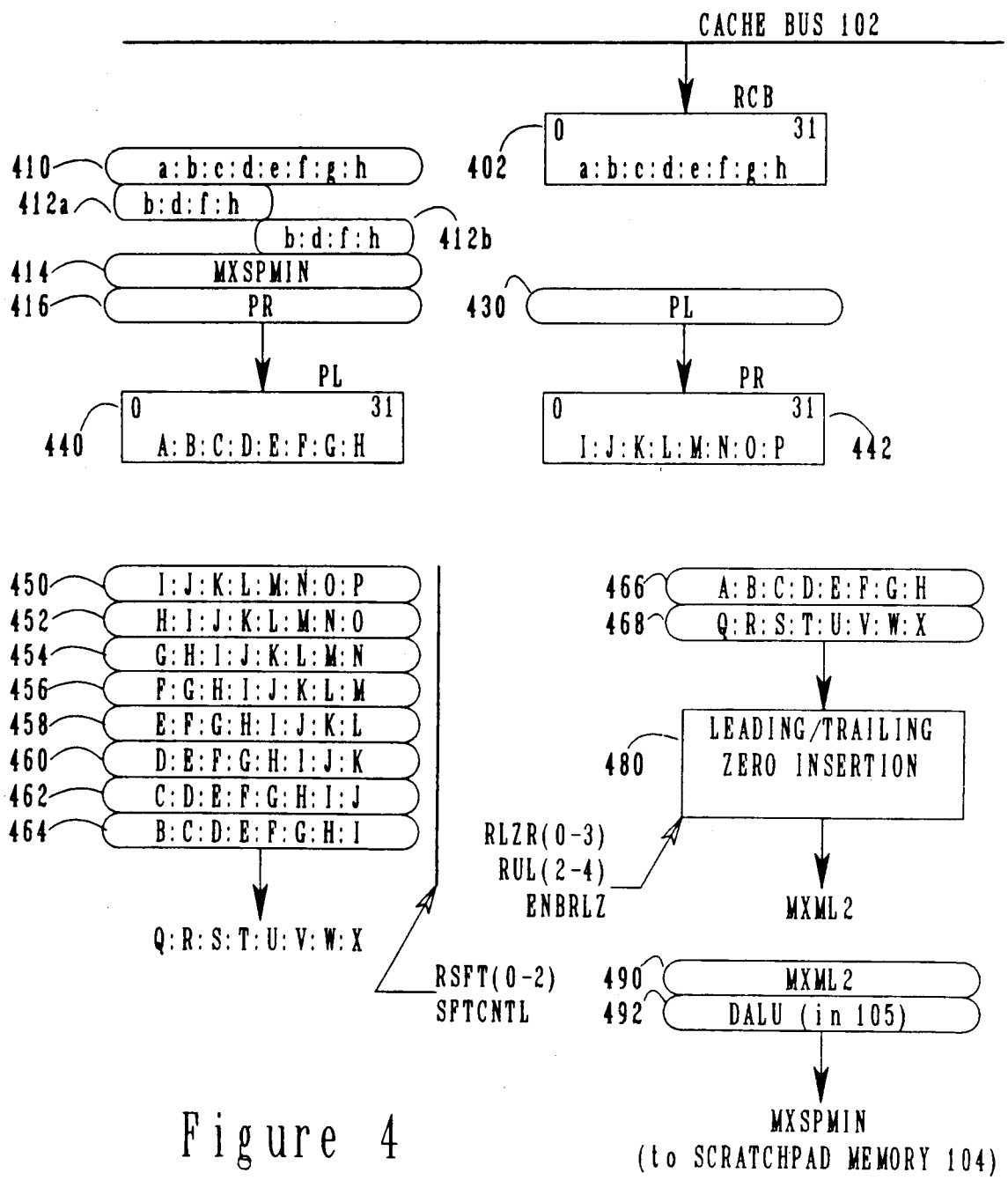
FIG. 4 depicts the digit shifter of the present invention.

Referring briefly to FIG. 4, at the time the double word containing the MSD of the first operand is being fetched, it appears on Cache Bus 102 and is input to register RCB 402, whence it may be inspected by the CIP. This could be useful for inspecting the sign of leading sign data; however, this is not germane to the present example, which assumes unsigned operands.

Figure 3:
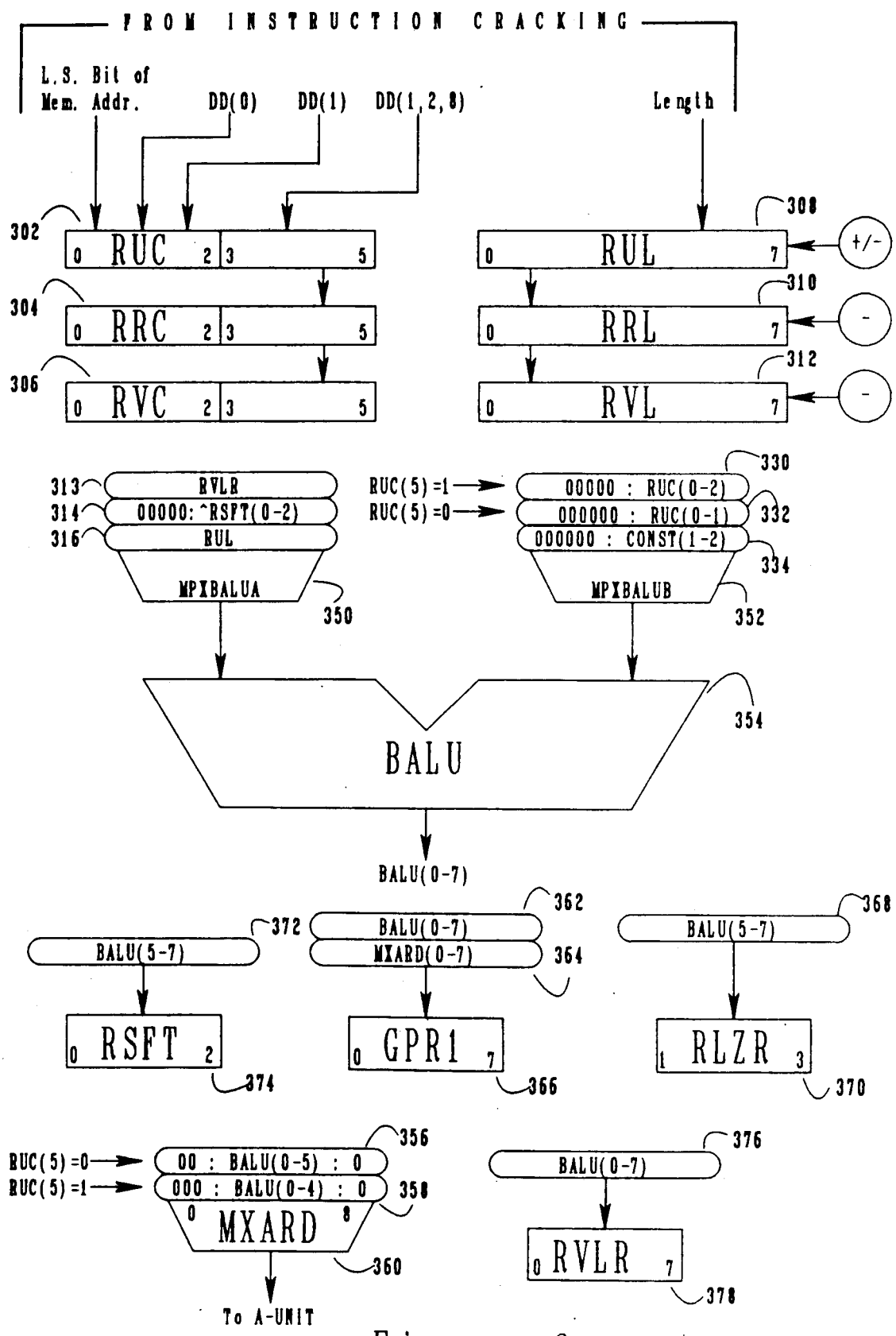
FIG. 3 depicts the setup logic of the present invention.

Referring to FIG. 3, during instruction decoding and fetching of the first operand, register RUC 302 receives certain address and DD information: Bit 0 receives the least significant bit of the memory address computed for the operand, which as described above is the address of the word containing the MSD. Therefore this bit is a word offset within a double word, since double-word boundaries coincide with even-numbered memory addresses which have a least significant bit of zero. RUC 302 bits 1 and 2 receive bits 0 and 1 from the DD. Because the first operand is a zoned operand, as will be discussed below in connection with switches 330 and 332 only bits 0 and 1 of RUC 302 will be used in calculation; correlation with the location of the operand as shown in FIG. 1 and with the makeup of a DD for zoned data will reveal that these two bits constitute a byte offset from a double-word boundary to the first byte of the operand. For the present example, the value in these two bits is 11B. This value may be referred to in the ensuring discussion as "Bo", denoting the "byte offset".

Bits 3-5 of RUC 302 receive bits 1, 2, and 8 respectively of the DD. Correlation with the DD makeup reveals that these three bits thus store the data type, with RUC bit 5 denoting whether the operand is packed or zoned.

Register RUL 308 receives the length from the DD. It is an 8-bit register, since string manipulation instructions (not discussed in connection with the present invention) may handle operands up to 256 characters long. The length for the commercial arithmetic instructions is limited to six bits; these will be right-justified in RUL 308.

As FIG. 3 indicates, RUL 308 has provision to be incremented or decremented; this takes place under control of the CIP's firm ware. (The firmware will not be directly given herein; firmware to effectuate the functionality detailed herein is realizable by those in the art.) As noted above, the length for the first operand (in an 8-bit number) is 00000010B, which may be referred to in the ensuing discussion as "L".

Some of the calculations to be described require the quantity L−1. This is obtained by enabling switch 316 (the switches are composed of gates, the inputs being connoted by the legends inscribed in the switch symbols) which inputs the length from RUL 1308 to BALU 354; firmware directs BALU 354 to decrement by one. The quantity L−1 thus appears on the lines BALU(0–7); firmware enables switch 376, gating the quantity into RVLR 378 where it is held for subsequent use.

Next, firmware enables switches 313 and 332. The determination to enable switch 332, as opposed to 330, is predicated on RUC(5) being equal to 0, reflecting that DD(8) is 0, indicating that the first operand is a zoned operand. Firmware will also instruct BALU 354 to perform an add operation. The operation is thus to compute L−1+Bo, since RVLR contains L−1 and RUC(0–1) are seen to contain Bo, the byte offset from the present double-word boundary in system memory to the start of the present operand. Under the present example, this yields a sum of 00000100B on lines BALU(0–7).

While this bit configuration is present on lines BALU(0–7), firmware enables several other switches in order to capture the a configuration in various forms: Switch 372 is enabled to gate 100B into RSFT 374. As a function of RUC(5), indicating that the present operand is a zoned one, switch 356 (rather than 358) is enabled producing 00000010B out of multiplexor MXARD 360; this number, having a value of two, is sent to the A-Unit to instruct it that the LSD of the operand is in the memory double word including the word being offset by that value (2) beyond the double word containing the MSD; responsive to this, the A-Unit will subsequently retrieve and forward that double word. Also at this time, firmware enables switch 364, gating 00000001B into GPR1 366.

Next, the contents of RSFT 374 are operated upon: firmware enables switches 314 and 334, and instructs BALU 354 to perform a logical AND. RSFT 374 having been loaded to 100B as described above, switch 314 passes the complement of that (complementing being denoted by the " " symbol) which is 00000011B; firmware a provides 11B for the value of CONST(1-2), so switch 334 is passing 00000011B. The resultant logical AND value output on lines BALU(0–7) is 00000011B; switch 372 is enabled to pass 011B into RSFT 374.

RLZR 370 is set up by enabling switches 316 and 368, and by instructing BALU 354 to simply pass the input MPXBALUA 350; this passes the three least significant bits from RUL 308, setting RLZR 370 to 010B.

It was mentioned that RUL 308 has provision to be incremented or decremented under firmware control; it is decremented at this time, changing its contents to 00000001B.

This completes the operation of Setup Logic 101 for the first operand; it will now be shown how the setups thus made control Digit Shifter 103 to achieve the objects of the invention.

As noted above, the A-Unit will at some point send on Cache Bus 102 the double word containing the LSD of the operand. With brief reference to FIG. 1 it will be seen that this double word contains 32xxxxxxH. It is input to register RCB 402 on FIG. 4, in which the four-bit digit positions are denoted by lower case letters of the alphabet. Firmware, responsive to RUC(5) being equal to 0 denoting the current operand to be a zoned operand, enables one of switches 412a or 412b (as opposed to switch 410); this being the first double word retrieved, switch 412b is enabled, allowing 2xxxH to be gated into positions E, F, G, and H of register PL 440. It will be appreciated that this gating strips out the zone fields.

As was described above, register GPR1 366 (FIG. 3) contained 001B; this is interpreted as one less than the number of double words to fetch—i.e., since GPRI contained a value equal to 1, 2 double words must be fetched. At this time, firmware decrements GPRI to 000B and instructs the A-Unit to send the double word having the next lower address. Referring briefly to FIG. 1, that double word contains xxxxxx31H; it is input to register RCB 402.

Responsive to RUC(5) being equal to 0 and this being the second double word, firmware enables switch 412a, passing xxx1H a into positions A, B, C, and D of PL 440, which thus contains xxx12xxxH; that is, it contains the desired operand, in packed format in the digit positions denoted D and E.

Firmware now enables switch 430, transferring xxx12xxxH into register PR 442. GPRI having been decremented to zero indicates that fetching from memory is completed for this operand. The present desired operand, the number 12, is in digit positions L and M.

Switches 450 through 464 comprise the digit shifter of the present invention. It does not literally "shift" bits, but rather achieves the effect of digit shifting by passing any desired eight contiguous digits of the sixteen digits available in registers 440 and 442. Depending on whether switch 466 or switch 468 is enabled, either the shifter output (denoted as digit positions Q through X) or the unshifted contents of register 440 may be employed.

SFTCNTL ("Shift Control") is a firmware signal controlling whether left-shifting or right-shifting is to be performed. During fetching of operands, it will specify right-shifting. The value contained in RSFT 374 then specifies which of switches 450 through 464 is to be selected: 450 for a value of 000B, 452 for value of 001B, and so on through 464 for a value of 0111B.

At this point in the present example, RSFT 374 having been loaded with a value of 011B as noted above, switch 456 is selected. Firmware also enables switch 468, gating xxxxxx12H into Leading/Trailing Zero Insertion Logic 480.

As described above, RUL 308 was left with contents of 00000001B. RUL(2–4) thus contain 000B; this is interpreted as being one greater than the number of double words that must be stored in Scratchpad Memory 104 for the present operand. It thus indicates in the present example that the present double word, although the first, is also the last that will be stored in Scratchpad Memory for the current operand; therefore, leading zero fill must be performed. The signal ENBRLZ, a firmware signal permits the leading zero fill. RLZR 370 specifies the number of digit positions that must not be zero-filled; RLZR 370 a was loaded with 010B as described above, which indicates that 010B or 2 (decimal) digits are not to be filled; therefore, six leading zeros are inserted, causing the output on lines MXML2 to be 00000012H, which is the first operand specified by the assumed instruction, right justified and zero-filled, which is the object of the invention. Switch 490 is enabled to pass this double word on to Scratchpad Memory 104 for storage.

Referring again to FIG. 3, in preparation for processing of the second operand firmware advances the contents of RUC 302 to RRC 304, and the contents of RUL 308 to RRL 310.

Again for the second operand, the instruction cracking logic provides to bit 0 of RUC 302 the least significant bit of the memory address containing the MSC of the operand; reference to FIG. 1 reveals this bit to be a 1, since the MSD is in the second word of a double word. bits 0 and 1 of the DD are provided to bits 1 and 2 respectively of RUC 302; RUC(0-2) thus contain 110B.

DD bits 1, 2, and 8 are provided to RUC 302 bits (3-5); reference to FIG. 1 indicates that these bits will contain 001B.

The length from the DD (6 bits) is loaded right-justified into RUL 308, which will thus contain 00001101B. By the same means as for the first operand, the length decremented by one (L−1) is set into RVLR 378, which thus contains 00001100B.

Firmware then enables switches 330 (as opposed to 332, because RUC(5) is now equal to 1, indicating that the present operand is a packed operand) and 313, and instructs BALU 354 to perform an add. It is thus adding 00001100B (through switch 313) and 00000110B (through switch 330) and produces the sum 00010010B on lines BALU(O-7). By enabling switch 330 and passing RUC(O-2), it is thus a digit offset (Do, the number of digit (half-byte) positions from a double word boundary to the MSD) that is being passed, rather than a byte offset (Bo) as was the case for the first operand. The sum may therefore be characterized as L−1+Do.

Switch 358 (as opposed to 356, predicated on RUC(5) indicating the present operand to be a packed one) is enabled, gating 000000100B through multiplexor MXARD 360 and to the A-Unit; this number, having a value of 4, instructs the A-Unit that the double word containing the word that contains the LSD includes the word that is offset by that value (4) from the word containing the LSD. Also, switch 364 is enabled, gating 00000010B into GPR1 366. This will be interpreted as one less than the number of double words that must be fetched; reference to FIG. 1 shows that the present operand spans three double words in memory, so this value, being equal to two decimal, is the appropriate value.

Now RSFT 374 will be set to the value that will be required for subsequent control of Digit Shifter 103. Switches 316 and 330 are enabled, and BALU 354 is instructed to perform an ADD; this calculates the quantity L+Do, having a value in the present example of 00010011B. Switch 372 is enabled, gating the three rightmost bits, 011B, into RSFT 374. Then switch 314 is enabled, passing the complement of 011B or 100B in the rightmost bits, and BALU 354 is instructed to add one. The sum (101B) is passed by switch 372 into RSFT 374.

RLZR 370 is set by enabling switch 316, instructing BALU 354 to pass that input, and enabling switch 368. RLZR thus contains the three rightmost bits of the length, 101B.

Firmware then decrements RUL 308, so that its contents become 00001100B.

This completes the operation of Setup Logic 101 for the second operand.

Subsequently, the double word containing the LSD will be presented on Cache Bus 102 and received into RCB 402 (FIG. 4). FIG. 1 reveals this double word to contain 123xxxxxH Switch 410 is enabled, gating this double word into PL 440. GPRI 366 is decremented from 010 to 001; still being positive, it indicates that the next lower-addressed double word is to be fetched.

That double word, which FIG. 1 shows to contain 34567890H appears on Cache Bus 102 and is received into RCB 402. Switch 430 gates 123xxxxxH from PL 440 into PR 442. Switch 410 gates 34567890H into PL 440.

Responsive to RSFT(0-2) 374 having been set to 101B, or a value of 5, during cracking, switch 460 is enabled at this time and will be seen to pass 67890123H, the 8 least significant digits of the operand in right-justified double-word form. Switch 468 is likewise enabled and passes this double word on to Leading/Trailing Zero Insertion Logic 480; RUL 308, bits 2-4, were set to a value of 001B or one decimal, indicating that two SPM words were to be stored (one more than the value in bits 2-4)—this being the first SPM word, no zero insertion is called for. The double word is passed on through switch 490 and stored in SPM 104.

GPR1 366 is decremented from 001B to 000B; still being positive, it indicates that another double word is to be fetched. That double word subsequently appears on Cache Bus 102 and is received into RCB 402. FIG. 1 reveals that double word to contain xxxxxx12H. GPR1 indicates that this is the last double word to be fetched.

Switch 430 is now enabled, passing 34567890H from PL 440 to PR 442. Switch 410 is now enabled, passing the xxxxxx12H into PL 440. Again under control of RSFT 374 having a contents of 101B, Switch 460 is enabled, passing xxx12345H; switch 468 passes this into Logic 480. The count in RUL 308 bits(2-4) indicating that this is the last double word to be stored in SPM 104 for this operand, it must be determined whether zero-filling is to be performed. RLZR 370 was set up based on information available during cracking, as described above, to a value of 101B, or five decimal; this instructs Logic 480 that the five rightmost positions are not to be filled—that is, to insert 3 leading zeros, so that a double word containing 00012345H is passed to Switch 490 and on to SPM 104 for storage and subsequent computation by Arithmetic Processor 105.

It is thus seen that the two operands are stored in SPM 104, right justified on double word boundaries and filled out with leading zeros, during operand fetch. No further manipulation of them is required prior to performing the requested arithmetic operation upon them.

Having discussed the operation of the invention during the fetching of two example operands of particular lengths and data a types, we will now state the functions performed for all six of the data types accommodated by the arithmetic processor of the present invention. Those in the art will appreciate, in light of the foregoing, that setting up according to the rules given algorithmically in Table 2 will result in right-justified, zero filled storage of operands for any of the data arrangements The following conventions are employed in Table 2:

TABLE 2

```
denotes Complement
& denotes Logical AND
+ denotes numerical addition
− denotes numerical subtraction
L-denotes the length of the operand (as specified in the DD,
right-justified in an eight-bit word)
Bo = RUC(0-1) = starting byte offset of zoned data block
Do = RUC(0-2) = starting digit offset of packed data block
NDWF = number of double words to fetch from or store in
system memory (held in GPR1))
NSPDW = number of SPM double words (held in RUL(2-4))
```

| DATA TYPE | NDWF | RSFT (Bits 5-7) | RLZR (Bits 5-7) | NSPDW (Bits 2-4) |
| --- | --- | --- | --- | --- |
| ZL | 00:((L-1+Bo)(0-5)) | (L-1+Bo)&011 | L-1 | L-2 |
| ZT | 00:((L-1+Bo)(0-5)) | (L-2+Bo)&011 | L-1 | L-2 |
| ZU | 00:((L-1+Bo)(0-5)) | (L-1+Bo)&011 | L | L-1 |
| TP | 00:((L-1+Bo)(0-5)) | (L-1+Bo)&011 | L | L-1 |
| PT | 000:((L-1+Do)(0-4)) | (L-1+Do)+1 | L | L-2 |
| PU | 000:((L-1+Do)(0-4)) | (L+Do)+1 | L | L-1 |

The invention may be embodied in other specific forms without departing from the spirit thereof. The invention is intended to be embraced by the appended claims rather than limited by the foregoing description of the preferred embodiment.

What is claimed is:

1. In a data processing system having a memory for storing instructions and operands, and having means for sequentially retrieving the instructions and having means responsive to the instructions for performing operations upon the operands, the memory being organized as contiguous addressable words, each word comprising an integral multiple of eight bits, the memory being adapted to retrieve and store double words each comprising two contiguous words beginning on an even-numbered word address called a double word boundary, the operands being stored in the memory as contiguous packed (four-bit binary coded decimal (BCD)) digits which may begin and end on any four-bit boundary within a word, an operand's most significant digit being its leftmost or lowest-addressed digit, the instructions having provision to specify each operand's length, its type as packed, the memory double word address in which it begins, and its offset in digits from its double-word boundary to its first digit, said means for performing operations upon the operands including an arithmetic processor including a scratchpad memory organized as contiguous double words for receiving and holding operands retrieved from the memory and ALU means connected to the scratchpad memory for performing arithmetic operations upon the operands, alignment apparatus for presenting retrieved operands to the scratchpad memory right-justified on double word boundaries, comprising:

first means coupled to said memory for receiving each instruction, said first means for calculating from said length, type and offset provided in the instruction, a number of double words that must be fetched from the memory in order to retrieve the entire operand, the number being designated NDWF:

second means operatively coupled to said first means and to said memory for receiving said each instruction, said second means for calculating from said length, type and offset provided in the instruction, a number of digit positions the operand must be shifted to the right in order to right-justify it on a double-word boundary, the number being designated RSFT;

third means operatively coupled to said first means and to said memory for receiving said each instruction, said third means (316, 350, 354, 368, 370) for calculating from said length and type provided in the instruction, a number of zeros required to precede the operand in a scratchpad memory double word, the number being designated RLZR;

fourth means operatively coupled to said first means, second means and to said memory, said fourth means for fetching from the memory, NDWF double words containing the operand, starting with the operand's highest addressed word and progressing consecutively through lower addresses;

first and second register means coupled to said memory, said first register means for holding a double word most recently fetched from the memory and second register means for holding a double word next most recently fetched from the memory;

fifth means coupled to said first and second register means and to said scratchpad memory, said fifth means selecting from the first and second register means, a number of said first register's rightmost digits, the number being equal to RSFT, and a number of said second register's leftmost digits, the number being equal to the difference between the number of digits in a double word and RSFT, and said fifth means storing in a double word location in the scratchpad memory a double word having as its leftmost digits the digits selected from the most recently fetched double word and as its rightmost digits the digits selected from the next most recently fetched double word; and sixth means coupled to said memory and to said fifth means, said sixth means responsive to a completion of fetching NDWF double words from the memory for inserting in the double word to be stored in the scratchpad memory RLZR leading zero digits so that the operand is stored in the scratchpad memory right justified on a double word boundary and filled with leading zeros staring from a double word boundary.

2. The data processing system recited in claim 1, wherein further:

the operands may alternatively be stored in the memory as contiguous zoned (eight-bit ASCII or EBCDIC coded numbers) which may begin and end on any eight-bit boundary within a word, the instructions have provision for specifying the type of each operand as packed or zoned, and wherein said alignment apparatus further includes seventh means connected to the input of the first register means and responsive to a zoned type specification for selecting four least significant bits of every eight-bit ASCII or EBCDIC byte received in the double word retrieved from the memory and transferring said four least significant bits to the first register means as a BCD digit.

3. The data processing system recited in claim 2, wherein further:

the operands may further include leading signs or trailing signs;

the instructions have provision for specifying each operand's type as one of packed unsigned, packed with trailing sign, zoned unsigned, zoned with leading sign, or zoned with trailing sign.

4. A method of aligning operands retrieved from a memory for storing instructions and operands of a system which includes means for sequentially retrieving the instructions and has means responsive to the instructions for performing operations upon the operands, said memory being organized as contiguous addressable words, each word comprising an integral multiple of eight bits, the memory being adapted to retrieve and store double words each comprising two contiguous words beginning on an even-numbered word address called a double word boundary, the operands being stored in the memory as contiguous packed (four-bit binary coded decimal (BCD)) digits which may begin and end on any four-bit boundary within a word, an operand's most significant digit being its leftmost or lowest-addressed digit, the instructions having provision to specify each operand's length, its type as packed, the memory double word address in which it begins, and its offset in digits from its double-word boundary to its first digit, said means for performing operations upon the operands including an arithmetic processor including a scratchpad memory organized as contiguous double words for receiving and holding operands retrieved from the memory and ALU means connected to the scratchpad memory for performing arithmetic operations upon the operands, said method of aligning retrieved operands for presentation to the scratchpad memory right-justified on double word boundaries comprising the steps of:

first calculating from said length, type and offset provided in the instruction a number of double words that must be fetched from the memory in order to retrieve the entire operand, the number being designated NDWF;

next calculating from said length, type and offset provided in the instruction, a number of digit positions the operand must be shifted to the right in order to right-justify it on a double-word boundary, the number being designated RSFT;

then calculating from said length and type provided in the instruction a number of zeros required to precede the operand in a scratchpad memory double word, the number being designated RLZR;

fetching from the memory, NDWF double words containing the operand, starting with the operand's highest addressed double word and progressing consecutively through lower addresses;

storing a double word most recently fetched from the memory and a double word most recently fetched from the memory in first and second registers respectively;

selecting from the first and second registers, a number of said first registers rightmost digits, the number being equal to RSFT, and a number of said second register's leftmost digits, the number being equal to the difference between the number of digits in a double word and RSFT;

storing in a double word location in the scratchpad memory a double word having as its leftmost digits the digits selected from the most recently fetched double word and as its rightmost digits the digits selected from the next most recently fetched double word; and, inserting in the double word to be stored in the scratchpad memory RLZR leading zero digits upon completion of fetching NDWF double words from memory so that the operand is stored in the scratchpad memory right justified on a double word boundary and filled with leading zeros starting from a double word boundary.

5. The method of claim 4 wherein the operands may alternatively be stored in the memory as contiguous zoned (eight-bit ASCII or EBCDIC coded numbers) which may begin and end on any eight-bit boundary within a word and wherein the instructions have provision for specifying the type of each operand as packed or zoned, said method further including the step of selecting four least significant bits of every eight-bit ASCII or EBCDIC byte received in the double word retrieved from the memory in response to a zoned type specification and transferring said four least significant bits to the first register means as a BCD digit.

6. The method of claim 5 wherein the operands further include leading signs or trailing signs and the instructions have provision for specifying each operand's type as one of packed unsigned, packed with trailing sign, zoned unsigned, zoned with leading sign, or zoned with trailing sign.

* * * * *